United States Patent
Du

(10) Patent No.: US 12,091,885 B2
(45) Date of Patent: Sep. 17, 2024

(54) SYSTEMS AND METHODS FOR CONTROLLING AN INTELLIGENT LOCK

(71) Applicant: BEIJING QISHENG SCIENCE AND TECHNOLOGY CO., LTD., Beijing (CN)

(72) Inventor: Muguo Du, Beijing (CN)

(73) Assignee: BEIJING QISHENG SCIENCE AND TECHNOLOGY CO., LTD., Beijing (CN)

( * ) Notice: Subject to any disclaimer, the term of this patent is extended or adjusted under 35 U.S.C. 154(b) by 1035 days.

(21) Appl. No.: 17/022,003

(22) Filed: Sep. 15, 2020

(65) Prior Publication Data

US 2021/0032903 A1 Feb. 4, 2021

Related U.S. Application Data

(63) Continuation of application No. PCT/CN2018/096680, filed on Jul. 23, 2018.

(30) Foreign Application Priority Data

Mar. 15, 2018 (CN) .......................... 201810215601.2

(51) Int. Cl.
E05B 47/00 (2006.01)
E05B 67/28 (2006.01)
(Continued)

(52) U.S. Cl.
CPC .......... *E05B 47/0001* (2013.01); *E05B 67/28* (2013.01); *G06Q 20/36* (2013.01);
(Continued)

(58) Field of Classification Search
CPC ...... E05B 47/00; E05B 47/0001; E05B 67/28; E05B 2047/0094; H04W 4/80; G06Q 20/36; G07C 9/00571
(Continued)

(56) References Cited

U.S. PATENT DOCUMENTS 9,830,759 B2 * 11/2017 Hilton ................. E05B 47/0012
2010/0313614 A1 * 12/2010 Rzepecki ............... B62H 5/145
70/233

(Continued)

FOREIGN PATENT DOCUMENTS

CN 101645186 A 2/2010
CN 103778705 A 5/2014
(Continued)

OTHER PUBLICATIONS

The Extended European Search Report in European Application No. 18909749.6 mailed on Mar. 31, 2021, 8 pages.
(Continued)

*Primary Examiner* — Suzanne L Barrett
(74) *Attorney, Agent, or Firm* — METIS IP LLC

(57) ABSTRACT

The present disclosure is related to systems and methods for controlling an intelligent device. The intelligent device includes a locking component and a control component. The method includes: determining, by the control component, a certification target within a preset range of the locking component; determining, by the control component, a type of the certification target; and unlocking, by the control component, the locking component through an unlocking mode corresponding to the type of the certification target.

11 Claims, 10 Drawing Sheets

(51) Int. Cl.
*G06Q 20/36* (2012.01)
*G07C 9/00* (2020.01)
*H04W 4/80* (2018.01)

(52) U.S. Cl.
CPC .......... *G07C 9/00571* (2013.01); *H04W 4/80* (2018.02); *E05B 2047/0094* (2013.01)

(58) Field of Classification Search
USPC ........................................................... 70/20
See application file for complete search history.

(56) References Cited

U.S. PATENT DOCUMENTS

| | | |
|---|---|---|
| 2016/0063782 A1 | 3/2016 | Yu |
| 2016/0140788 A1 | 5/2016 | Delevoye |
| 2017/0069154 A1 | 3/2017 | Hilton et al. |

FOREIGN PATENT DOCUMENTS

| | | | | |
|---|---|---|---|---|
| CN | 204117216 U | | 1/2015 | |
| CN | 105023365 A | | 11/2015 | |
| CN | 103856500 B | | 12/2016 | |
| CN | 106355769 A | | 1/2017 | |
| CN | 106368529 A | * | 2/2017 | .............. E05B 11/00 |
| CN | 106373282 A | | 2/2017 | |
| CN | 106408726 A | * | 2/2017 | |
| CN | 106447467 A | * | 2/2017 | |
| CN | 106447468 A | * | 2/2017 | ......... G06Q 30/0645 |
| CN | 106600781 A | | 4/2017 | |
| CN | 106710035 A | | 5/2017 | |
| CN | 106815938 A | | 6/2017 | |
| CN | 107045743 A | | 8/2017 | |
| CN | 107093240 A | | 8/2017 | |
| CN | 107323593 A | | 11/2017 | |
| CN | 107689094 A | | 2/2018 | |
| DE | 19528203 C1 | * | 10/1996 | ............... B62H 5/00 |
| EP | 2620919 A1 | | 7/2013 | |
| EP | 3130729 A1 | | 2/2017 | |
| KR | 101296863 B1 | | 8/2013 | |
| WO | 2017041097 A1 | | 3/2017 | |

OTHER PUBLICATIONS

International Search Report in PCT/CN2018/096680 mailed on Dec. 25, 2018, 5 pages.
Written Opinion in PCT/CN2018/096680 mailed on Dec. 25, 2018, 4 pages.
First Office Action in Chinese Application No. 201810215601.2 mailed on Feb. 6, 2020, 28 pages.
The Second Office Action in Chinese Application No. 201810215601.2 mailed on Sep. 30, 2020, 26 pages.

* cited by examiner

SYSTEMS AND METHODS FOR CONTROLLING AN INTELLIGENT LOCK

CROSS REFERENCE TO RELATED APPLICATIONS

This application is a continuation of International Application No. PCT/CN2018/096680, filed on Jul. 23, 2018, which claims priority of Chinese Patent Application No. 201810215601.2, filed on Mar. 15, 2018, the contents of which are hereby incorporated by reference.

TECHNICAL FIELD

The present disclosure relates to an intelligent device, and more particularly to a system and method for controlling an intelligent lock.

BACKGROUND

With the development of internet and the sharing economy, shared services, due to their great advantages, are becoming more and more popular. The shared services include, for example, car sharing, carpooling, bike sharing, etc. For example, as a new type of bike rental service, bike sharing can be used in many situations, such as commuting, leisure, and fitness. It is also an efficient way to connect residents to a public transportation network. In essence, bike sharing facilitates people's travel, and has the effect of alleviating traffic jams, saving energy and reducing emissions.

Traditionally, the management or use of traditional bike sharing can only be achieved by manual operation or through a physical card, which is not convenient for users and administrators. Thus, it is desirable to develop a method and system for automatic controlling (e.g. controlling bike locks) that can improve user experience and management efficiency.

SUMMARY

According to an aspect of the present disclosure, an intelligent device is provided. The intelligent device may include a locking component configured to lock a target object. The intelligent device may also include a control component configured to perform the following operations, for example, detect appearance of a certification target within a preset range of the control component; determine a type of the certification target; direct the locking component to operate an unlock operation according to the type of the certification target.

In some embodiments, the intelligent device may further include a target object. The target object may include a bicycle or a motorcycle.

In some embodiments, the locking component may further include an arc structure configured to lock the target object. The unlock operation may include retracting the arc structure into a housing on the target object.

In some embodiments, to determine a type of the certification target, the control component may be configured to determine that the certification target is a user terminal.

In some embodiments, to direct the locking component to operate an unlock operation according to the type of the certification target, the control component is configured to determine whether the user terminal includes a target application; in response to a determination that the user terminal includes a target application, obtain certification information from the target application of the user terminal, and unlock the locking component based on the certification information.

In some embodiments, the control component is further configured to: obtain correlation information from the user terminal; determine whether the correlation information satisfies a first preset condition; in response to the determination that the correlation information satisfies the first preset condition, unlock the locking component based on the correlation information.

In some embodiments, the correlation information is associated with at least one of bank account information, electronic wallet information, public transportation account information, or social security information.

In some embodiments, to determine the type of the certification target, the control component is configured to determine that the certification target is a physical card.

In some embodiments, to direct the locking component to operate an unlock operation according to the type of the certification target, the control component is configured to: obtain card information from the physical card; determine whether the card information satisfies a second preset condition; in response to that the card information satisfies the second preset condition, unlock the locking component based on the card information.

In some embodiments, to detect appearance of a certification target within a preset range of the control component, the control component is configured to obtain electric signals of the certification target within a preset range of the locking component using a near field communication (NFC) technology.

In some embodiments, to determine the type of the certification target, the control component is configured to: obtain an identification tag of the certification object; determine the type of the certification target based on the identification tag.

According to another aspect of the present disclosure, a method for controlling an intelligent device is provided. The intelligent device may include a locking component and a control component. The method may include, for example, determining, by the control component, a certification target within a preset range of the locking component; determining, by the control component, a type of the certification target; and unlocking, by the control component, the locking component through an unlocking mode corresponding to the type of the certification target.

According to still another aspect of the present disclosure, a system for controlling an intelligent device is provided. The system may include at least one storage medium storing a set of instructions and at least one processor configured to communicate with the at least one storage medium. When executing the set of instructions, the at least one processor is directed to perform one or more of the following operations, for example, determine a certification target within a preset range of the locking component; determine a type of the certification target; and unlock the locking component through an unlocking mode corresponding to the type of the certification target.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. In some embodiments, the operations may be implemented in inverted order, or simultaneously. Moreover, one or more other operations may be added to the flowcharts. One or more operations may be removed from the flowcharts.

In an aspect, the present disclosure is directed to systems and methods for controlling a locking component (e.g., a physical lock) of an intelligent device. When the system detects a certification target (e.g., a physical card, a mobile device on which a target application is installed, a mobile device without the target application), the system may identify the type of the certification target, and unlock the locking component of the intelligent device through a certain unlocking mode corresponding to the type of the certification target.

Figure 1:
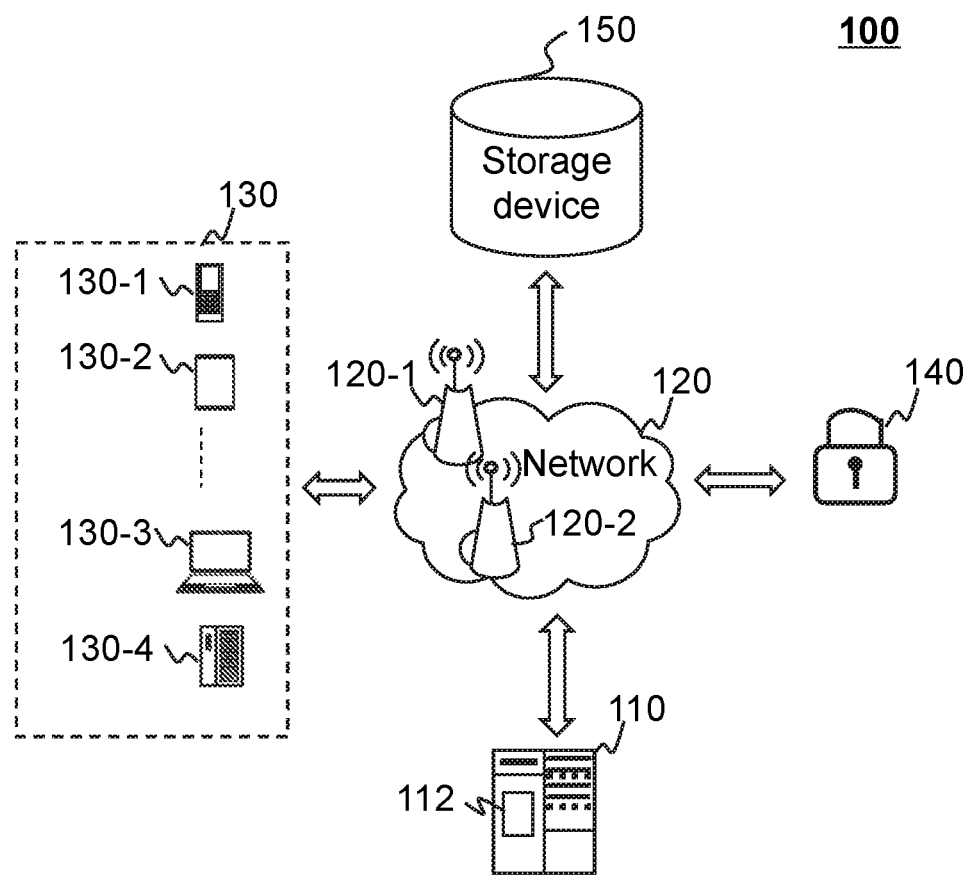
FIG. 1 is a schematic diagram of an exemplary lock controlling system according to some embodiments of the present disclosure.

FIG. 1 is a schematic diagram of an exemplary lock controlling system according to some embodiments of the present disclosure. The lock controlling system 100 may be used to control the unlocking/locking of a target object (e.g., a motorcycle, a bicycle, a safe box, etc.) via a locking component of an intelligent device. In some embodiments, the lock controlling system 100 may be used in rental services. For example, in a bike rental service, when a user sends certification information (e.g., membership information, payment account information) to rent a bicycle via a mobile terminal, the lock controlling system 100 may unlock the bicycle, then the user may use the bicycle. In some embodiments, the lock controlling system 100 may include a server 110, a network 120, a certification target 130, an intelligent device 140, and a storage device 150.

In some embodiments, the server 110 may be used to process information and/or data related to lock controlling. The server 110 may be an independent server or a server group. The server group may be centralized or distributed (e.g., the server 110 may be a distributed system). In some embodiments, the server 110 may be local or remote. For example, the server 110 may access information and/or data stored on the certification target 130, the intelligent device 140, and/or the database 150 through network 120. In some embodiments, the server 110 may be directly connected to the user terminal 130, the intelligent device 140, and/or the database 150 to access information and/or data stored therein. In some embodiments, the server 110 may be implemented on a cloud platform. For example, the cloud platform may include a private cloud, a public cloud, a hybrid cloud, a community cloud, a distributed cloud, an internal cloud, or the like, or any combination thereof.

In some embodiments, the server 110 may include a processing engine 112. The processing engine 112 may process information and/or data related to the service request to perform one or more functions described in the present disclosure. For example, the processing device 112 may receive an unlocking request signal sent by the user terminal 130, and unlock the intelligent device 140. In some embodiments, the processing engine 112 may include one or more sub-processing devices (e.g., single-chip processing devices or multi-core and multi-chip processing devices). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of data and/or information. In some embodiments, one or more components of the lock controlling system 100 (such as the server 110, the user terminal 130, the intelligent device 140, and the database 150) may transmit data and/or information to other component(s) of the lock controlling system 100 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, through which one or more components of the lock controlling system 100 may be connected to the network 120 to exchange data and/or information.

In some embodiments, a user who requests to use the intelligent device 140 may also be a user of the certification target 130. The user may unlock the intelligent device 140 via the certification target 130. The certification target 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof.

In some embodiments, the certification target 130 may be an entity (e.g., a card or a device) including personal information of a user. For example, the certification target 130 may be a bank card, a bus card, a subway card, a social security card, an ID card, or the like, or any combination thereof. In some embodiments, the certification target 130 may be a device with positioning technology for locating a user and/or the certification target 130.

The intelligent device 140 may include a locking component, a control component, and a target object. The control component may control the unlocking/locking of the target object through the locking component. The target object may refer to a shared device (e.g., a car, a bike, a safe box, a boat, a computer, an umbrella, etc.). In some embodiments, the locking component and the control component may be set on the target object. In some embodiments, the locking component and the control component may be installed outside the target object, and electrically connected to the target object. In some embodiments, the locking component may include a physical lock. The locking component and the control component may be physically attached to each other or separated. In some embodiments, the locking component and the control component may be physically attached and be installed together. In some embodiments, the locking component and the control component may be physically separated and be installed at different locations/positions.

In some embodiments, the intelligent device 140 may include a reminding component (e.g., a sound generator or a light emitter) that can remind a user after the target object is successfully unlocked or the control component fails to unlock the target object via the locking component. The intelligent device 140 may communicate with one or more components of the lock controlling system 100. In some embodiments, the intelligent device 140 may communicate with the certification target 130 to receive information or data sent by the certification target 130, or send information or data to the certification target 130. In some embodiments, the intelligent device 140 may communicate with the server 110 to acquire identification information when a user sends a request to the server.

The storage device 150 may store data and/or instructions. In some embodiments, the storage device 150 may store data obtained from the server 110, the certification target 130, and/or the intelligent device 140. In some embodiments, the storage 150 may store data and/or instructions that the server 110 may execute or use to perform exemplary methods described in the present disclosure. In some embodiments, the storage device 150 may include a mass storage, removable storage, a volatile read-and-write memory, a read-only memory (ROM), or the like, or any combination thereof. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the lock controlling system 100 (e.g., the server 110, the certification target 130, or the intelligent device 140). One or more components of the lock controlling system 100 may access the data or instructions stored in the storage device 150 via the network 120. In some embodiments, the storage device 150 may be directly connected to or communicate with one or more components of the lock controlling system 100 (e.g., the server 110, the certification target 130, the intelligent device 140). In some embodiments, the storage device 150 may be part of the server 110.

In some embodiments, one or more components of the lock controlling system 100 (e.g., the server 110, the certification target 130, the intelligent device 140) may have permissions to access the storage device 150. In some embodiments, one or more components of the lock controlling system 100 may read and/or modify information related to the service requester, service provider, and/or the public when one or more conditions are met. For example, in a vehicle rental service, the server 110 may read and/or modify one or more users' information after the user returns a vehicle. As another example, when the intelligent device 140 receives an unlock request from the certification target 130, the intelligent device 140 may access but not modify information related to the user(s).

In some embodiments, information exchanging of one or more components of the lock controlling system 100 may be initiated by way of requesting a service. The object of the service request may be any product. In some embodiments, the product may include food, medicine, commodity, chemical product, electrical appliance, clothing, car, housing, luxury, or the like, or any combination thereof. In some other embodiments, the product may include a servicing product, a financial product, a knowledge product, an internet product, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In some embodiments, the software and/or application may be a software and/or application for renting an item. For example, the software and/or application may be used to rent a vehicle or a non-vehicle device. Correspondingly, the intelligent device may include a vehicle or a non-vehicle device. For a vehicle rental software and/or application, the vehicle may include a shared bicycle, a shared electric bicycle, a shared automobile, or the like, or any combination thereof. For a non-vehicle device rental software and/or application, the non-vehicle device may include a locker, a parcel pickup box, a gaming machine, a KTV machine, or the like, or any combination thereof.

Figure 2:
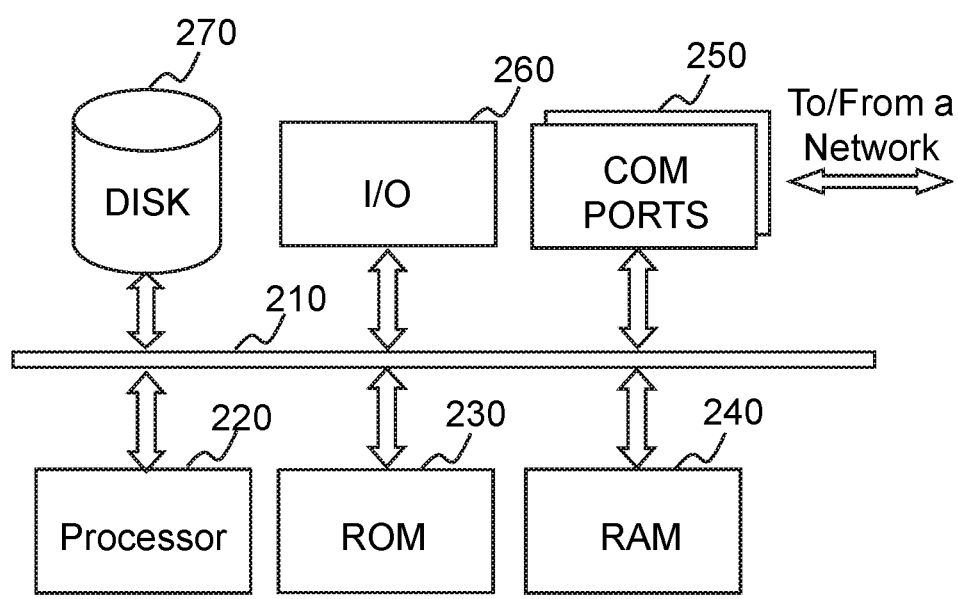
FIG. 2 is a schematic diagram illustrating exemplary hardware and/or software components of a computing device according to some embodiments of the present disclosure.

FIG. 2 is a schematic diagram illustrating exemplary hardware and/or software components of a computing device according to some embodiments of the present disclosure. In some embodiments, the server 110, the certification target 130, and/or the intelligent device 140 may be implemented on the computing device 200. For example, the processing engine 112 may be implemented on the computing device 200 and configured to perform functions of the processing engine 112 disclosed in this disclosure.

The computing device 200 may be used to implement any component of the lock controlling system 100 as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms to distribute the processing load.

The computing device 200, for example, may include COM ports 250 connected to and from a network connected thereto to facilitate data communications. The computing device 200 may also include a processor 220, in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read only memory (ROM) 230, or a random access memory (RAM) 240, for various data files to be processed and/or transmitted by the computing device. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one processor is described in FIG. 2. Multiple processors are also contemplated, thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
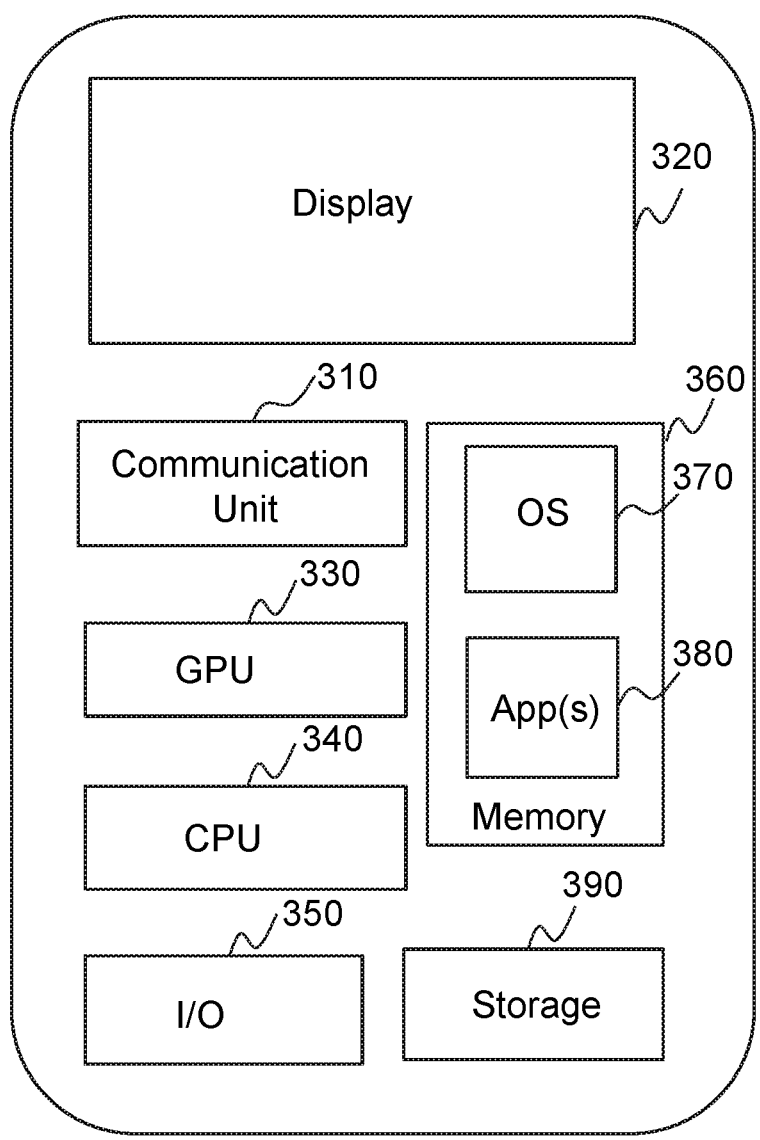
FIG. 3 is a schematic diagram illustrating exemplary hardware and/or software components of an exemplary mobile device 300 on which the certification target 130 and/or the intelligent device 140 may be implemented according to some embodiments of the present disclosure.

FIG. 3 is a schematic diagram illustrating exemplary hardware and/or software components of an exemplary mobile device 300 on which the certification target 130 and/or the intelligent device 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the on-demand service system 100. User interactions with the information stream may be achieved via the I/O 350 and provided to the processing engine 112 and/or other components of the lock controlling system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
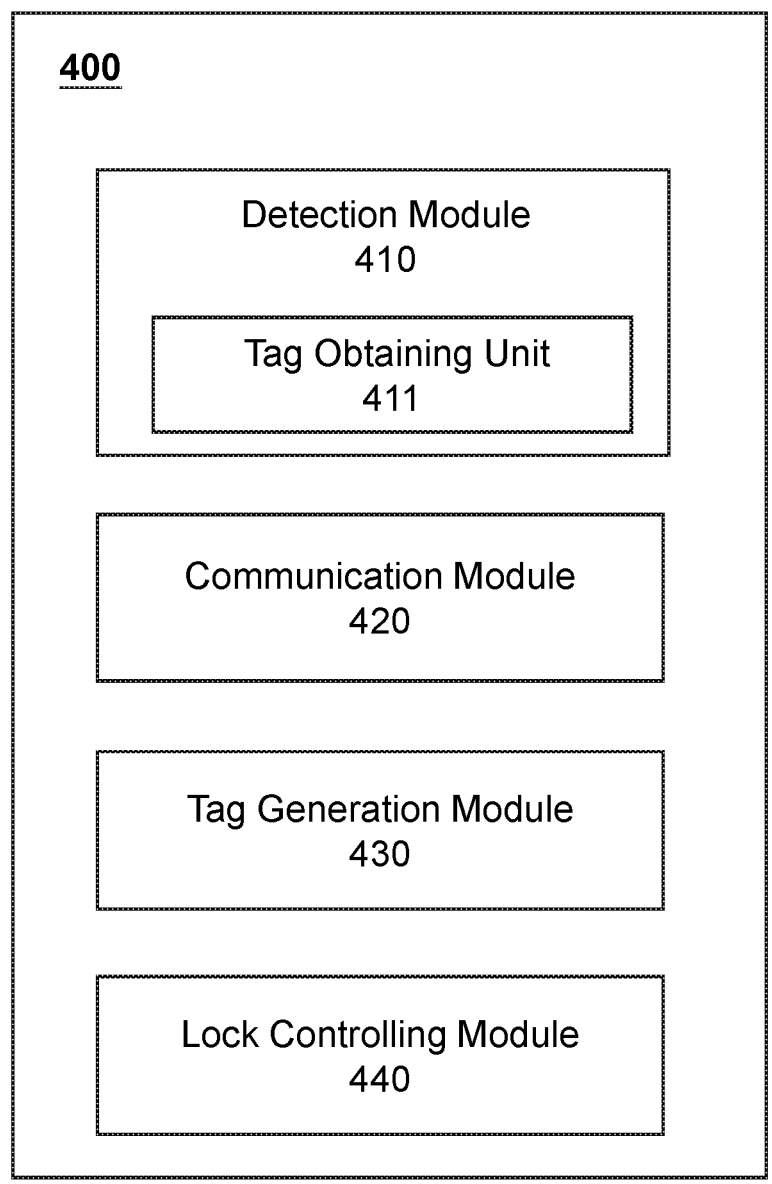
FIG. 4 is a block diagram illustrating an exemplary control component of the intelligent device according to some embodiments of the present disclosure.

FIG. 4 is a block diagram illustrating an exemplary control component of the intelligent device according to some embodiments of the present disclosure. The control component may include a detection module 410, a communication module 420, a tag generation module 430, and a lock controlling module 440.

The detection module 410 may detect appearance of a certification target 130 within a preset range of the intelligent device. In some embodiments, the certification target 130 may be a user terminal. For example, the certification target 130 may be a mobile phone, a tablet computer, or the like. In some embodiments, the certification target 130 may be a card. For example, the certification target 130 may be a bank card, a bus card, a subway card, a social security card, an ID card, or the like. In some embodiments, the detection module 410 may detect the certification target within a preset range (e.g., 0.5 centimeter, 2 centimeter, etc.) of the intelligent device by emitting a detection signal. For example, the detection module 410 may generate an electro-magnetic signal. In some embodiments, the detection signal may be in a form of microwaves. In some embodiments, the detection module 410 may emit detection signals continuously. In some embodiments, the detection module 410 may emit detection signals at a regular interval. In some embodiments, the detection module 410 may use a short range communication technology to detect the certification target within the preset range of the intelligent device. The short range communication technology may include near field communication (NFC), radio frequency identification (RFID), bluetooth, Wifi, Zigbee, ultra wideband (UWB), mesh network, thread network, Z-wave, light fidelity (LiFi), or the like, or any combination thereof. The preset range may be determined based on the technology used by the detection module 410 to emit the detection signal. For example, when the detection module 410 uses NFC technology to detect the certification target within the preset range of the intelligent device, the preset range may be within 0.4 m, 0.3 m, 0.2 m, or 0.1 m of the intelligent device. When there is a certification target 130 within the preset range of the intelligent device, the detection signal may interact with the certification target, and generate a detection result signal that returns to the detection module 410. When there is no certification target within the preset range of the intelligent device, the detection module 410 may not receive a detection result signal.

In some embodiments, the detection module 410 may include a tag reading unit. The tag reading unit may read an identification tag in the certification target 130. The identification tag may be a tag carrying identification information of the certification target 130. The identification tag may be correlated to correlation information. The tag reading unit may obtain the identification information. For example, the identification information may include information of a type of the certification target 130, an identity (e.g., a unique ID number that distinguishes a certain certification target from other certification targets) of the certification target 130, a model of the certification target 130, or the like, or any combination thereof. As another example, the identification information may include position information of the certification target 130. As still another example, the identification information may be in forms of an identification code (e.g., passwords). In some embodiments, the identification tag may be a microchip set in the certification target 130. For example, the identification tag may be a RFID tag. As another example, the identification tag may be NFC tag. In some embodiments, the tag reading unit may generate an electro-magnetic signal. The electro-magnetic signal may interact with the identification tag of the certification target 130, and an electric current is induced in the identification tag. The certification target 130 may transmit the identification information of the identification tag to the tag reading unit via the induced electric current. In some embodiments, the identification tag of the certification target 130 may actively send the identification information to the tag reading unit. In some embodiments, the tag reading unit may determine a type of the certification target 130. For example, the certification target 130 may be a user terminal including a target application, a user terminal not including the target application, or a physical card. In some embodiments, the identification tag of the certification target 130 may include type information, and the tag reading unit may determine the type of the certification target 130 based on the type information.

In some embodiments, the certification target 130 may be a user terminal with an identification tag. In some embodiments, the identification tag of the user terminal may be correlated to correlation information. Merely by examples, the correlation information may include bus card information, subway card information, bank card information, social security card information, mobile phone card information, or the like, or any combination thereof. With the correlation information, the user terminal may act as an electronic card. The tag reading unit may obtain the identification information and the correlation information.

In some embodiments, the certification target 130 may be a user terminal including a target application, and the user terminal may actively send an unlock request through the target application. In some embodiments, the user terminal may obtain the identification information of the intelligent device 140, and the unlock request may contain the identification information. For example, to obtain the identification information, the user terminal may generate an electro-magnetic signal. The electro-magnetic signal may interact with the tag generation module 430, and an electric current is induced in the tag generation module 430. The detection module 410 may determine, based on the induced current, the appearance of the certification target 130 within the preset range of the intelligent device, and the type of the certification target 130 is a user terminal including the target application.

The intelligent device 140 may communicate with other devices via the communication module 420. In some embodiments, the intelligent device 140 may communicate with the certification target 130 within the preset range of the intelligent device 140 via the communication module 420. In some embodiments, the communication module 420 may use short range communication technology to communicate with the certification target 130 within the preset range of the intelligent device. For example, the communication module 420 may communicate with the certification target 130 within the preset range of the intelligent device using near field communication (NFC), radio frequency identification (RFID), Bluetooth, Wifi, Zigbee, Ultra Wideband (UWB), mesh network, thread network, Z-wave, Light Fidelity (LiFi), or the like, or any combination thereof. In some embodiments, the intelligent device 140 may communicate with the server 110 via the communication module 420.

In some embodiments, the communication module 420 may include an information acquisition unit. The information acquisition unit may acquire information. In some embodiments, the certification target 130 may be a user terminal with an identification tag. In some embodiments, the identification tag may be correlated to correlation information, and the information acquisition unit may acquire information of an account associated with the correlation information. In some embodiments, the certification target 130 may be a physical card (e.g., a bus card, etc.), and the information acquisition unit may acquire account information of the physical card. In some embodiments, the information acquisition unit may acquire information from an internal memory of the intelligent device 140 or a memory external to the intelligent device 140. In some embodiments, the information acquisition unit may acquire information from the server 110, the storage device 150, a third-party database, or a third-party server. For example, the information acquisition unit may acquire information of an account from a database of a bank, a database of a social security institution, a database of a credit assessment organization, and the like. In some embodiments, the information acquisition unit may determine whether to unlock the intelligent device 140 based on the acquired account information. In some embodiments, the information acquisition unit may determine to unlock when the account information indicates that the user of the certification target 130 has a good credit record. In some embodiments, the information acquisition unit may refuse to unlock when the user of the certification target 130 has a bad credit record. In some embodiments, the information acquisition unit may determine to unlock when the account information indicates that the user of the certification target 130 has a sufficient balance. In some embodiments, the information acquisition unit may refuse to unlock when the user of the certification target 130 has insufficient balance. In some embodiments, the information acquisition unit may determine to unlock when the account information indicates that the user of the certification target 130 has passed a real name information authentication. In some embodiments, the information acquisition unit may refuse to unlock when the user of the certification target 130 has not passed the real name authentication. In some embodiments, the information acquisition unit may send the lock controlling module 440 an instruction to unlock or refuse to unlock.

The tag generation module 430 may generate identification information. The identification information may indicate the identity (e.g., a unique ID number that distinguishes a certain intelligent device from other intelligent devices) of the intelligent device 140. In some embodiments, the tag generation module 430 may include an electronic identification tag. The electronic identification tag may include an electronic code. In some embodiments, the tag generation module 430 may include a physical identification tag. For example, the physical identification tag may include a quick response code (QR code), a bar code, or the like. In some embodiments, the certification target 130 may read the identification information of the tag generation module 430 of the intelligent device 140 so as to determine the identity of the intelligent device 140, and send an unlock request to the server 110 or the intelligent device 140 based on the identity of the intelligent device 140.

The lock controlling module 440 may control the unlocking or locking of the locking component of the intelligent device 140. In some embodiments, the lock controlling module 440 may be electrically connected to the locking component. In some embodiments, the locking component may be a physical lock. In some embodiments, the locking component may include a virtual lock. In some embodiments, the lock controlling module 440 may unlock the locking component according to the unlock instruction sent by the communication module 420 (for example, the information acquisition unit).

It should be understood that the system and the modules shown in FIG. 4 may be implemented in a variety of ways. In some embodiments, the system and the modules may be implemented by hardware, software, or a combination thereof. The hardware may be implemented by a dedicated logic. The software may be stored in a memory and may be implemented by an appropriate instruction executing system (e.g., a microprocessor, a dedicated design hardware, etc.). It will be appreciated by those skilled in the art that the above method and system may be implemented by computer-executable instructions and/or embedding in control codes of a processor. For example, the control codes may be provided by a medium such as a disk, a CD or a DVD-ROM, a programmable memory device such as read-only memory (e.g., firmware), or a data carrier such as an optical or electric signal carrier. The system and its modules of the present disclosure may be implemented by hardware circuits, e.g., very large scale integrated circuits or gate arrays, semiconductors such as logic chips or transistors, programmable hardware devices such as field-programmable gate arrays, programmable logic devices, or the like. The system and its modules may be implemented by software executed by various processors. The system and its modules may also be implemented by a combination (e.g., firmware) of the hardware circuits and the software.

It should be noted that the intelligent device 140 and its modules described above is merely provided for the purposes of illustration, and not intended to limit the scope of the present disclosure. It would be understood for those skilled in the art that after understanding the principle of the system, various modules may be combined, the connection between a subsystem and the other module may be constituted, and modification and change in the form and details of the application field of the method and system may be implemented without departing from this principle. In some embodiments, the detection module 410, the communication module 420, the tag generation module 430 and the control module 440 may be different modules in a system, or it can be a module to realize the functions of the above two or more modules. For example, the detection module 410 and the communication module 420 may be combined into a single module. In some embodiments, any module may be added or omitted. For example, the tag module 230 may be omitted. In some embodiments, the intelligent device 140 may also include a storage module. The storage module may communicate with one or more of the detection module 410, the communication module 420, the tag generation module 430, and the lock controlling module 440. For example, the storage module may store data acquired or generated by other modules. For another example, the storage module may provide related data to other modules.

Figure 5:
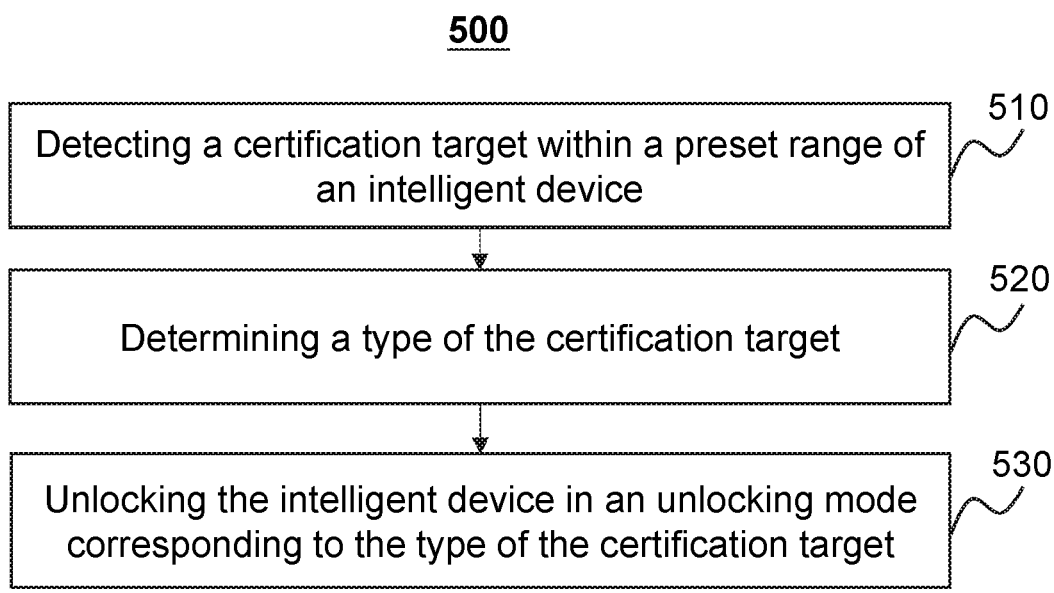
FIG. 5 is a flowchart illustrating an exemplary process for lock controlling according to some embodiments of the present disclosure.

FIG. 5 is a flowchart illustrating an exemplary process for lock controlling according to some embodiments of the present disclosure. In some embodiments, the process 500 shown in FIG. 5 may be implemented in the lock controlling system 100 illustrated in FIG. 1. For example, at least a part of the process 500 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIG. 4). In some embodiments, a part of the process 500 may be implemented on a terminal device. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, a certification target within a preset range of the intelligent device may be determined. In some embodiments, the certification target may be detected by the detection module 410.

In some embodiments, the intelligent device 140 may include a vehicle. For example, the intelligent device may include a bicycle, a motorcycle, a tricycle, a car, or the like, or any combination thereof. In some embodiments, the intelligent device may include a non-vehicle device. For example, the intelligent device may include a locker, a safe box, a parcel box, a gaming machine, a KTV machine, or the like, or any combination thereof. The intelligent device 140 may detect the certification target within a preset range (e.g., 0.5 centimeter, 2 centimeter, etc.) of the intelligent device by emitting a detection signal. In some embodiments, the detection signal may be in a form of microwaves. When there is a certification target in the preset range, the detection signal may interact with the certification target, and generate a detection result signal that returns to the intelligent device 140. The intelligent device 140 may determine that there is a certification target within the preset range of the intelligent device 140 based on the detection result signal. In some embodiments, the certification target 130 may be a user terminal. For example, the certification target 130 may be a mobile phone, a tablet computer, or the like. In some embodiments, the certification target 130 may be a physical card. For example, the certification target 130 may be a bank card, a bus card, a subway card, a social security card, an ID card, or the like.

In some embodiments, the intelligent device 140 may use a short range communication technology to detect the certification target within the preset range of the intelligent device. The short range communication technology may include near field communication (NFC), radio frequency identification (RFID), Bluetooth, Wifi, Zigbee, Ultra Wideband (UWB), mesh network, thread network, Z-wave, Light Fidelity (LiFi), or the like, or any combination thereof. In some embodiments, the preset range may be determined according to the communication technology used by the intelligent device 140.

In some embodiments, the intelligent device 140 may use NFC technology to detect the certification target 130 within a preset range of the intelligent device. NFC technology allows two devices, one of which may be a mobile device, such as a smartphone, to communicate with each other within a distance (e.g. a few centimeters). In some embodiments, the intelligent device 140 may generate an electro-magnetic signal. The electro-magnetic signal may interact with an identification tag of the certification target 130 (if the certification target 130 has an identification tag), and an electric current may be induced in the identification tag. In some embodiments, the identification tag may be a microchip set in the certification target 130. For example, the identification tag may be a RFID tag. As another example, the identification tag may be NFC tag. The identification tag may carry identification information of the certification target 130. The identification information may include information of the type of the certification target 130, an identity (e.g., a unique ID number that distinguishes a certain certification target from other certification targets) of the certification target 130, or the like, or any combination thereof. In some embodiments, the identification may include the position information of the certification target 130. In some embodiments, the identification information may be in forms of an identification code (e.g., passwords). If a certification target is positioned within a preset range of the intelligent device 140, the certification target may send identification information to the intelligent device 140 through the induced electric current, so that the intelligent device 140 may identify the certification target 130. In some embodiments, the identification tag of the certification target 130 may actively send the identification information to the intelligent device 140, so that the intelligent device 140 may identify of the intelligent device 130 within the preset range of the intelligent device 140.

In some embodiments, the certification target 130 may be a user terminal on which a target application associated with the intelligent device 140 is installed, and the user terminal 130 may actively send an unlock request via the target application. In some embodiments, the target application may be a plug-in. For example, the target application may be a built-in applet, or the like, in a certain application. In some embodiments, the target application may be an application (e.g., a rental service app) associated with the intelligent device 140. For example, the target application may be an application for renting a shared bicycle, an electric bicycle, an automobile, or the like. As another example, the target application may be an application for renting a locker, a parcel box, a gaming machine, a KTV machine, or the like.

In 520, the type of the certification target may be determined. In some embodiments, the type of the certification target may be determined by the detection module 410.

In some embodiments, as described in 510, the intelligent device 140 may read the identification tag of the certification target 130 to obtain the identification information. In some embodiments, the identification information of the certification target 130 may indicate a type of the certification target 130. Thus, the intelligent device 140 may determine the type of the certification target 130 based the identification information. In some embodiments, the certification target 130 may be various types including, for example, a user terminal including a target application, a user terminal not including the target application, or a physical card.

In some embodiments, the certification target 130 may be a user terminal including a target application. In some embodiments, the user terminal may actively send an unlock request to the intelligent device 140 via the target application. In some embodiments, the certification target 130 may generate an electro-magnetic signal via the target application. The electro-magnetic signal may interact with the tag generation module 430, and an electric current may be induced in the tag generation module 430. The detection module 410 may determine the appearance of the certification target 130 within the preset range of the intelligent device based on the induced electric current, and determine the type of the certification target to be a user terminal including a target application.

In 530, the intelligent device may be unlocked through an unlocking mode corresponding to the type of the certification target. In some embodiments, the intelligent device may be unlocked by the lock controlling module 440.

In some embodiments, the certification target 130 may be a user terminal without a target application. In some embodiments, the user terminal may have an identification tag. In some embodiments, the identification tag may be associated with correlation information. Merely by examples, the correlation information may include bus card information, subway card information, bank card information, social security card information, subscriber identification module (SIM) card information, or the like, or any combination thereof. With the correlation information, the user terminal may act as an electronic card. Then the control component of the intelligent device 140 may unlock the target object via the locking component through a first unlocking mode. Merely for illustration purposes, the control component may obtain identification information and the correlation information of the identification tag, and the control component may unlock the locking component based on the correlation information. More descriptions of the first unlocking mode may be found elsewhere in the present disclosure, for example, FIG. 6 and the descriptions thereof.

In some embodiments, the certification target 130 may be a physical card. For example, the certification target 130 may be a physical bus card, a subway card, a social security card with an identification tag, or the like. The control component of the intelligent device 140 may unlock the target object via the locking component through a second unlocking mode. In some embodiments, the physical card may include an identification tag. For example, the physical card may include a built-in chip as the identification tag. In some embodiments, the detection module 410 may acquire identification information of the identification tag, and the control component may unlock the locking component based on the identification information. More descriptions of the second unlocking mode may be found elsewhere in the present disclosure, for example, FIG. 7 and the descriptions thereof.

In some embodiments, the certification target 130 may be a user terminal including a target application. The control component of the intelligent device 140 may unlock the target object via the locking component through a third unlocking mode. In some embodiments the user terminal may actively send an unlock request to the intelligent device 140 through the target application. In some embodiments, the user terminal may obtain the identification information of the intelligent device 140, and the unlock request may contain the identification information. For example, to obtain the identification information, the user terminal may generate an electro-magnetic signal through the target application. The electro-magnetic signal may interact with the tag generation module 430 (e.g., an electronic identification tag) of the intelligent device 140, and a current may be induced in the tag generation module 430. The tag generation module 430 may send the identification information of the intelligent device 140 to the user terminal via the induced current. The identification information may also indicate the identity of the intelligent device 140. The certification target 130 may determine the identity of the intelligent device 140 based on the received identification information, and generate an unlock request containing the identity of the intelligent device 140. In some embodiments, the user terminal may send the unlock request to the server 110, then the server 110 may send an unlock instruction to the control component to direct the control component to unlock the target object by controlling the locking component. In some embodiments, the user terminal may send the unlock request directly to the intelligent device 140, and the control component may unlock the intelligent device 140 based on the unlock request.

It should be noted that the process for lock controlling described above is merely provided for the purposes of illustration, and not intended to limit the scope of the present disclosure. It would be understood for those skilled in the art that after understanding the principle of the method, various steps may be combined in any manner, or any step can be added or removed without departing from this principle. For example, in some embodiments, 510 and 520 may be combined into a single step, which indicates that the intelligent device 140 may detect the appearance of the certification target within the preset range of the intelligent device and determine the type of the certification target at the same time.

Figure 6:
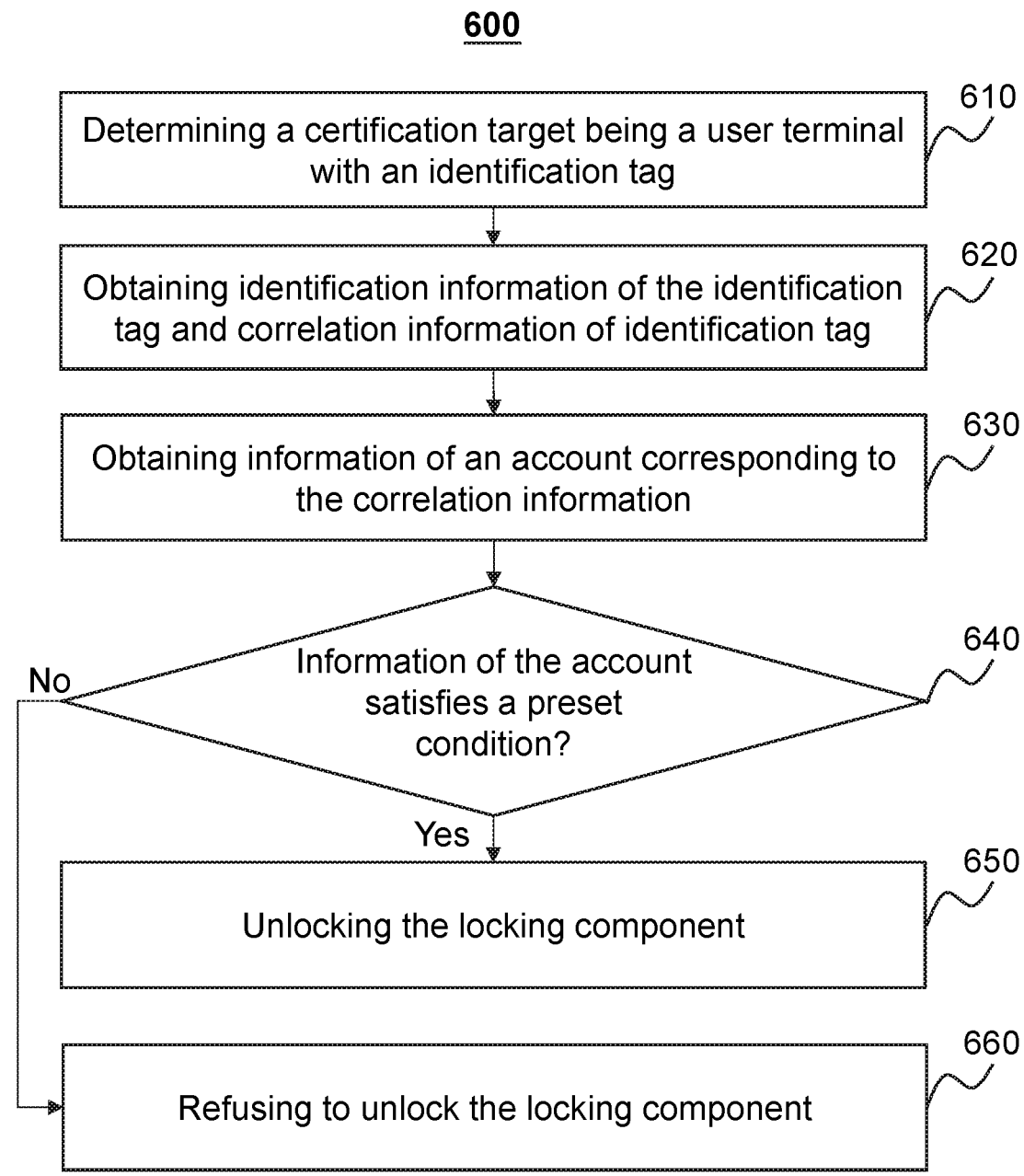
FIG. 6 is a flowchart illustrating an exemplary process for controlling an intelligent locking device via a user terminal with an identification tag according to some embodiments of the present disclosure.

FIG. 6 is a flowchart illustrating an exemplary process for controlling an intelligent locking device via a user terminal with an identification tag according to some embodiments of the present disclosure. The process herein described in FIG. 6 can also be referred to as a first unlocking mode. In some embodiments, the process 600 shown in FIG. 6 may be implemented in the lock controlling system 100 illustrated in FIG. 1. For example, at least a part of the process 600 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIG. 4). In some embodiments, a part of the process 600 may be implemented on a terminal device. The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 610, a processor or the detection module 410 may determine that the certification target 130 is a user terminal with an identification tag.

In some embodiments, the control component or the detection module 410 of the intelligent device 140 may determine that the certification target 130 is a user terminal with an identification tag. The control component of the intelligent device 140 may obtain identification information of the identification tag of the certification target 130. The identification information may include, for example, the type of the certification target, personal information of a user, and/or one or more accounts (e.g., bank account, social security account, etc.) associated with the locking component. The control component may determine that the certification target is a user terminal with an identification tag based on the identification information. In some embodiments, the determination that the certification target 130 is a user terminal with an identification tag may be the same as or similar to the operations in 510 and 520 in FIG. 5.

In 620, identification information of the identification tag and correlation information of the identification tag may be obtained. In some embodiments, identification information may be obtained by the detection module 410.

In some embodiments, the identification tag of the user terminal may be associated with correlation information. In some embodiments, the correlation information may be stored in the identification tag of the user terminal. In some embodiments, the control component may acquire the identification information and the correlation information at a same time. In some embodiments, the correlation information may include bus card information, subway card information, bank card information, social security card information, subscriber identification module (SIM) card information, or the like, or any combination thereof. With the correlation information, the user terminal 130 may act as an electronic card. For example, the identification information (e.g., identification code) of the identification tag of the user terminal may be associated with a bus card number, and the user terminal 130 may act as an electronic bus card.

In 630, information of an account corresponding to the correlation information may be obtained. In some embodiments, the information of the account may be obtained by the communication module 420.

The control component of the intelligent device 140 may obtain information of an account (also referred to as account information) corresponding to the correlation information. The account information may indicate a payment capacity or a credit record of the account corresponding to the card. In some embodiments, the control component may obtain the account information from the user terminal. In some embodiments, if the identification tag of the user terminal is correlated to the correlation information, the user terminal may obtain the account information corresponding to the correlation information, and store the account information in the identification tag of the user terminal 130. In some embodiments, the control component may obtain the account information at a same time when the correlation information is obtained. In some embodiments, the control component may obtain the account information from an internal memory of the control component or a memory external to the control component. In some embodiments, the control component may obtain the account information from the server 110, the storage device 150, a third-party database, or a third-party server. For example, the control component may obtain the account information from a database of a bank, a database of a social security institution, a database of a credit assessment organization, or the like. In some embodiments, the account information may include credit record information, balance information, real-name authentication information, or the like, or any combination thereof.

In 640, a determination as to whether the information of the account satisfies a preset condition may be made.

The control component of the intelligent device 140 may determine whether the information of the account obtained in 630 satisfies the preset condition, and determine whether to unlock the locking component of the intelligent device 140. In some embodiments, the preset condition may be that a user of the user terminal has a good credit record. Particularly, if the account information indicates that the user has a good credit record, the control component may unlock the locking component. In some embodiments, if the user has a bad credit record, the control component may refuse to unlock the locking component. In some embodiments, the preset condition may be that the user of the user terminal has a sufficient balance. The sufficient balance may indicate that the user of the user terminal has enough money to pay expenses of related products or services (e.g., a vehicle rental service). Particularly, when the account information indicates that the user of the user terminal has a sufficient balance, the control component may determine to unlock the locking component. In some embodiments, when the user of the user terminal has an insufficient balance, the control component may refuse to unlock the locking component. In some embodiments, the preset condition may be that the user of the user terminal has passed a real-name authentication. Particularly, when the account information indicates that the user of the user terminal has passed the real-name authentication, the control component may determine to unlock the locking component. In some embodiments, when the user of the user terminal has not passed the real name authentication, the control component may refuse to unlock the locking component.

If the account information satisfies the preset condition, the process may proceed to 650, otherwise, the process may proceed to 660.

In 650, the locking component may be unlocked. In some embodiments, 650 may be performed by the lock controlling module 440. For example, the control component of the intelligent device 140 may unlock the target object via the locking component.

The locking component may be, for example, a physical lock. In some embodiments, the locking component may include a virtual lock.

In 660, the control component may refuse to unlock the locking component. In some embodiments, operations in 660 may be performed by the lock controlling module 440. In some embodiments, the control component may send a reminder to the user terminal to inform the user that the unlocking operation has failed after the control component refuses to unlock the intelligent device. In some embodiments, the reminder may be in forms of texts, sounds and/or light blink.

It should be noted that the process 600 for controlling a lock described above is merely provided for the purposes of illustration, and not intended to limit the scope of the present application. It would be understood for those skilled in the art that after understanding the principle of the method, various steps may be combined in any manner, or any step can be added or removed without departing from this principle. For example, in some embodiments, 610 and 620 may be combined into a single step. Particularly, after the control component obtains the identification information of the identification tag of the certification target 130, the control component may determine the type of the certification target 130, and obtain the correlation information of the identification tag at a same time. As another example, 630, 640, and 660 may be omitted. Particularly, after the control component obtains identification information of the identification tag and the correlation information of the identification tag of the user terminal, the control component may directly unlock the locking component without obtaining the account information corresponding to the correlation information and/or determining whether the account information satisfies the preset condition.

Figure 7:
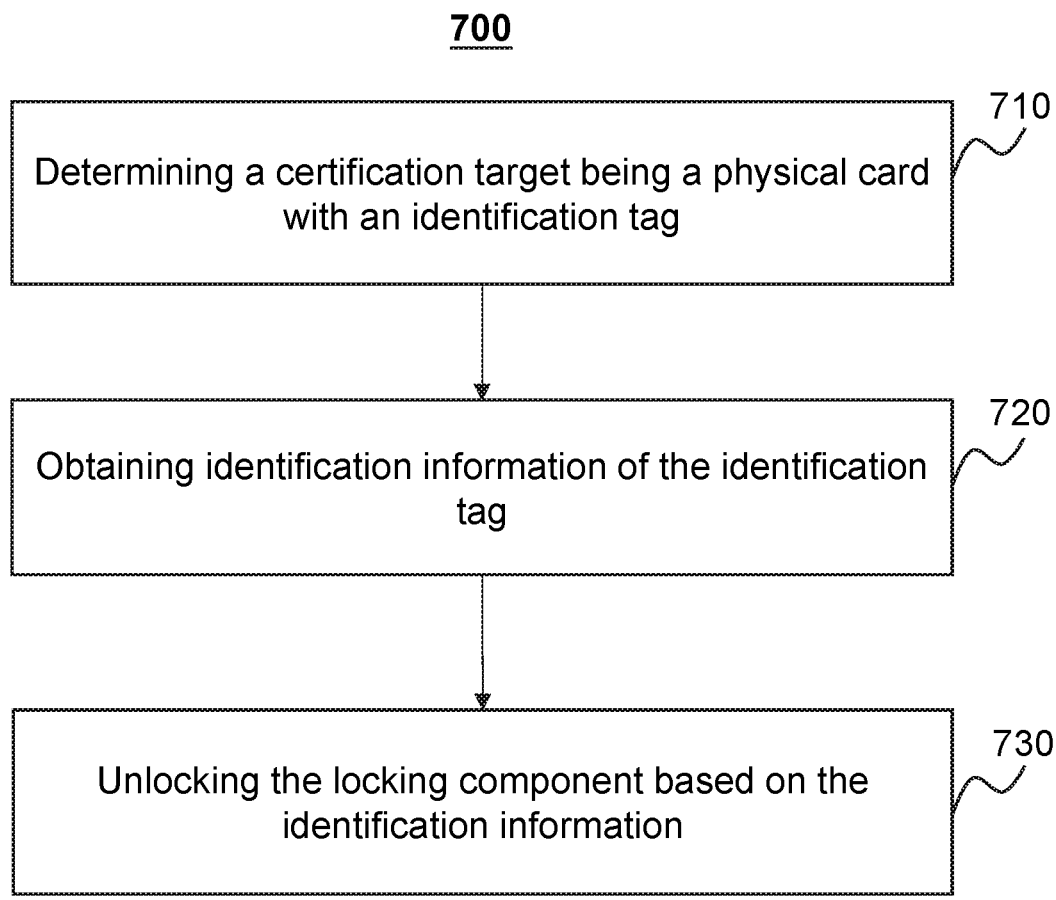
FIG. 7 is a flowchart of an exemplary process for controlling an intelligent locking device via a physical card with an identification tag according to some embodiments of the present disclosure.

FIG. 7 is a flowchart of an exemplary process for controlling an intelligent locking device via a physical card with an identification tag according to some embodiments of the present disclosure. The process herein described in FIG. 7 can also be referred to as a second unlocking mode. In some embodiments, the process 700 shown in FIG. 7 may be implemented in the lock controlling system 100 illustrated in FIG. 1. For example, at least a part of the process 700 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIG. 4). In some embodiments, a part of the process 700 may be implemented on a terminal device. The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, a certification target may be determined to be a physical card with an identification tag. In some embodiments, the type of the certification target may be determined by the detection module 410.

In some embodiments, the control component may obtain identification information of the identification tag of the certification target 130. The identification information may indicate the type of the certification target 130, an identity (e.g., a unique ID number that distinguishes a certain certification target from other certification targets) of the certification target 130, or the like, or any combination thereof. In some embodiments, the identification may include the position information of the certification target 130. In some embodiments, the identification information may be in forms of an identification code (e.g., passwords). The control component may determine that the certification target 130 is a physical card (e.g., a bus card number, a bus card balance, etc.) with an identification tag based on the identification information. In some embodiments, the determination that the certification target 130 is a physical card may be the same as or similar to the operations in 510 and 520 in FIG. 5.

In 720, identification information of the identification tag may be obtained. In some embodiments, the identification information may be obtained by the detection module 410.

In some embodiments, the identification information may include account information of the physical card. The account information may indicate a payment capacity or a credit record of the account corresponding to the card. For example, the account information may indicate the credit record of the user of the physical card. As another example, the account information may indicate the balance of the physical card. As still another example, the account information may indicate whether the user of the physical card has passed a real-name authentication.

In 730, the locking component of the intelligent device 140 may be unlocked based on the identification information.

The control component of the intelligent device 140 may determine the identity of the physical card based on the identification information. The physical card may have a unique identity that distinguishes the physical card from other physical cards. In some embodiments, the control component may determine whether the user of the physical card has a sufficient balance. For example, when the physical card is a bus card, the control component may determine whether the user of the bus card has a sufficient balance. If the user has a sufficient balance, the control component may determine to unlock the locking component of the intelligent device 140; otherwise, the control component may determine to refuse to unlock the locking component.

It should be noted that the process 700 for controlling a lock described above is merely provided for the purposes of illustration, and not intended to limit the scope of the present disclosure. It would be understood for those skilled in the art that after understanding the principle of the system, various modules may be combined, the connection between a subsystem and the other module may be constituted without departing from this principle. In some embodiments, it should be noted that the process 700 for controlling a lock described above is merely provided for the purposes of illustration, and not intended to limit the scope of the present application. The above description of the process 700 for controlling a lock is merely provided for explaining the method of unlocking based on identification information of the physical card. It would be understood for those skilled in the art that after understanding the principle of the method, various steps may be combined casually in any manner, or any step may be added or removed without departing from this principle. For example, in some embodiments, 710 and 720 may be combined into a single step. Particularly, after the control component reads the identification tag of the certification target 130, the control component may obtain identification information of the identification tag, and determine the type of the certification target at a same time.

Figure 8:
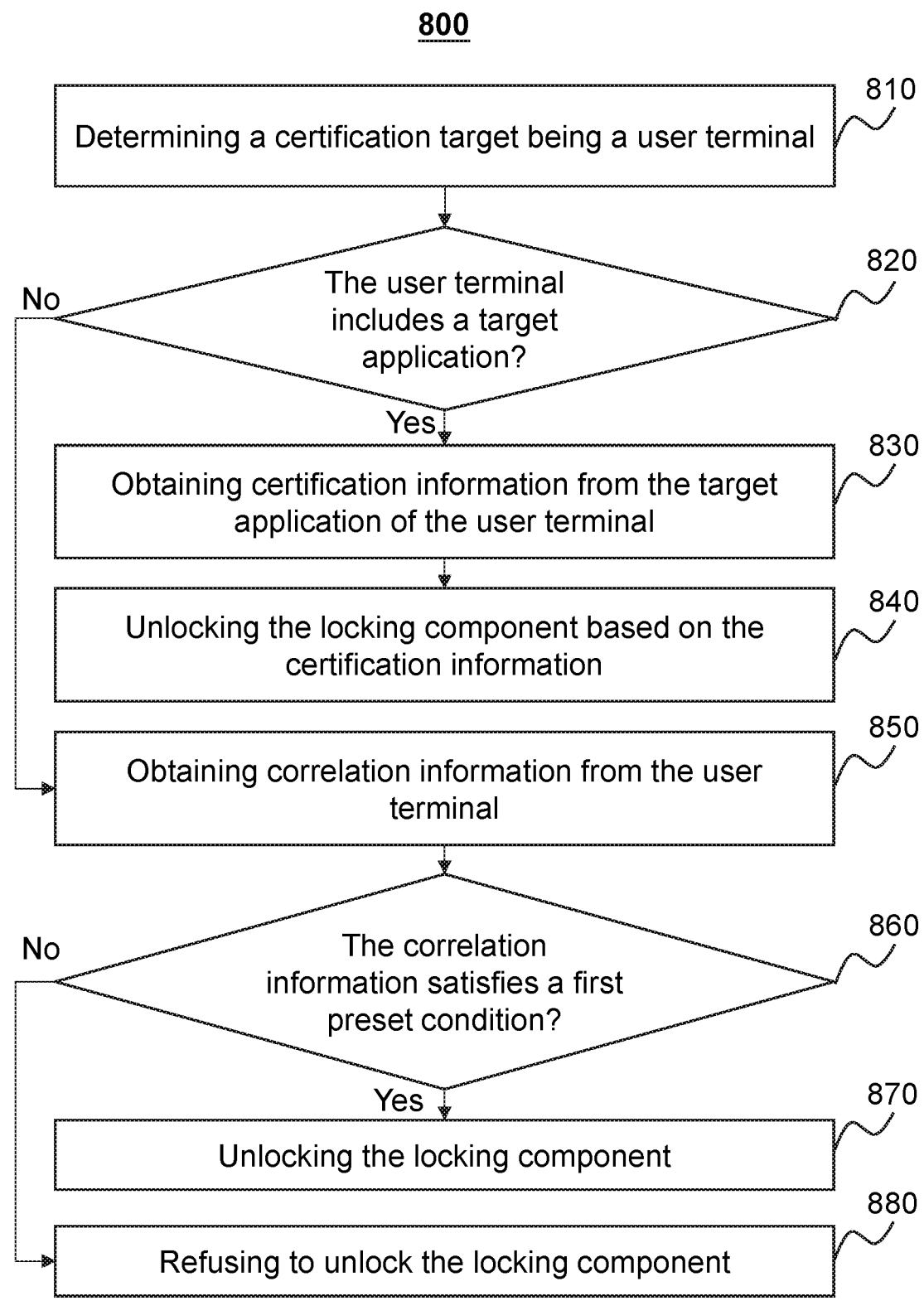
FIG. 8 is a flowchart illustrating an exemplary process for controlling a lock through a user terminal according to some embodiments of the present disclosure.

FIG. 8 is a flowchart illustrating an exemplary process for controlling a lock through a user terminal according to some embodiments of the present disclosure. In some embodiments, the process 800 shown in FIG. 8 may be implemented in the lock controlling system 100 illustrated in FIG. 1. For example, at least a part of the process 800 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIG. 4). In some embodiments, a part of the process 800 may be implemented on a terminal device. The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, a certification target may be determined to be a user terminal.

In some embodiments, the control component of the intelligent device 140 may determine the certification target 130 to be a user terminal. In some embodiments, the certification target 130 may generate an electro-magnetic signal that acts on the control component so as a current may be induced in the control component. The control component may determine the certification target 130 to be a user terminal based on the induced current.

In 820, a determination as to whether the user terminal includes a target application may be made.

In some embodiments, the control component of the intelligent device 140 may determine whether the user terminal includes a target application. In some embodiments, the user terminal may actively send an unlock request through the target application. For example, the user terminal may send an unlock request to a service server (e.g., the server 110). The server may return a feedback signal to the certification target 130 after the server receives the unlock request. Then the certification target 130 may transmit the feedback signal to the control component of the intelligent device 140. Alternatively, the server may send an operation instruction to the control component after the server receives the unlock request. The operation instruction may refer to computer code that can be used to direct the control component to conduct an operation. The control component may determine that the user terminal includes a target application if the control component receives the operation instruction. If the control component does not receive any feedback signal and/or operation instruction, the control component may determine that the user terminal does not include the target application. As another example, the user terminal may directly send an unlock request to the control component through the target application. The control component may determine that the user terminal includes the target application if the control component receives the unlock request. If the control component does not receive any unlock request, the control component may determine that the user terminal does not include the target application.

If the control component determines that the user terminal includes the target application, the process may proceed to 830, otherwise, the process may proceed to 850.

In 830, certification information may be obtained from the target application of the user terminal.

In some embodiments, the control component of the intelligent device 140 may obtain certification information from the target application of the user terminal. In some embodiments, the target application of the user terminal may generate or obtain the certification information. For example, the certification information may include an unlocking code. The unlocking code may be in forms of a series of numbers, a two-dimension code, a voiceprint code, a fingerprint code, etc. The control component may obtain the unlocking code from the target application. In some embodiments, the target application of the user terminal may generate or obtain an unlocking code after the user terminal sends the unlock request. In some embodiments, the certification information may be assigned to the target application when the target application is associated with a qualified user account. For example, when there is sufficient balance in a user account of a user, a target application of a user terminal of the user may generate or obtain certification information. As another example, when the user account is associated with a good credit record, the target application of the user terminal may be assigned with the certification information. As still another example, when the user account has passed a real name authentication, the target application of the user terminal may be assigned with the certification information.

In 840, the locking component may be unlocked based on the certification information.

The control component of the intelligent device 140 may unlock the locking component of the intelligent device 140 based on the certification information. In some embodiments, the control component may verify the certification information before the control component unlocks the locking component device. For example, the certification information may be an encrypted unlocking code. The control component may decrypt the encrypted unlocking code after the control component obtains the encrypted unlocking code. Then the control component may unlock the locking component based on the decrypted unlocking code. As another example, the control component may receive an operation instruction from the server, and determine whether the certification information obtained from the target application of the user terminal matches the operation instruction. If the certification information matches the operation instruction, the control component may unlock the locking component.

In 850, correlation information may be obtained from the user terminal.

When the user terminal does not include the target application, the control component may obtain correlation information from the user terminal. The user terminal may be associated with the correlation information. In some embodiments, the user terminal may have an international mobile equipment identity (IMEI), and the IMEI may be associated with the correlation information. The control component may determine the IMEI of the user terminal and obtain the correlation information based on the IMEI. In some embodiments, as described in FIG. 6, the user terminal may include an identification tag, and the identification tag may be associated with the correlation information. In some embodiments, the correlation information may include information of an account. For example, the correlation information may include bus card information, subway card information, bank card information, social security card information, SIM card information, or the like, or any combination thereof. With the correlation information, the user terminal may act as an electronic card.

In 860, a determination as to whether the correlation information satisfies a first preset condition may be made.

The control component may determine whether the correlation information satisfies a first preset condition. In some embodiments, the first preset condition may be that the user of the user terminal has a good credit record. In some embodiments, the first preset condition may be that the user of the user terminal has a sufficient balance. In some embodiments, the first preset condition may be that the user of the user terminal has passed a real-name authentication. The determination as to whether the correlation information satisfies a first preset condition may be same as or similar to the operations in 640 in FIG. 6.

If the correlation information satisfies the first preset condition, the process may proceed to 870, otherwise, the process may proceed to 880.

In 870, the locking component may be unlocked.

The control component may unlock the locking component of the intelligent device. In some embodiments, the locking component may include a physical lock, and the control component may unlock the physical lock if the correlation information satisfies the first preset condition. In some embodiments, the locking component may include a virtual lock, and the control component may unlock the virtual lock if the correlation information satisfies the first preset condition.

In 880, the control component may refuse to unlock the locking component. In some embodiments, after the control component refuses to unlock the locking component, the control component may send a reminder to the user terminal to inform the user that the unlocking operation has failed. In some embodiments, the control component may generate texts, sounds and/or light blinks to inform the user that the unlocking has failed after the control component refuses to unlock.

Figure 9:
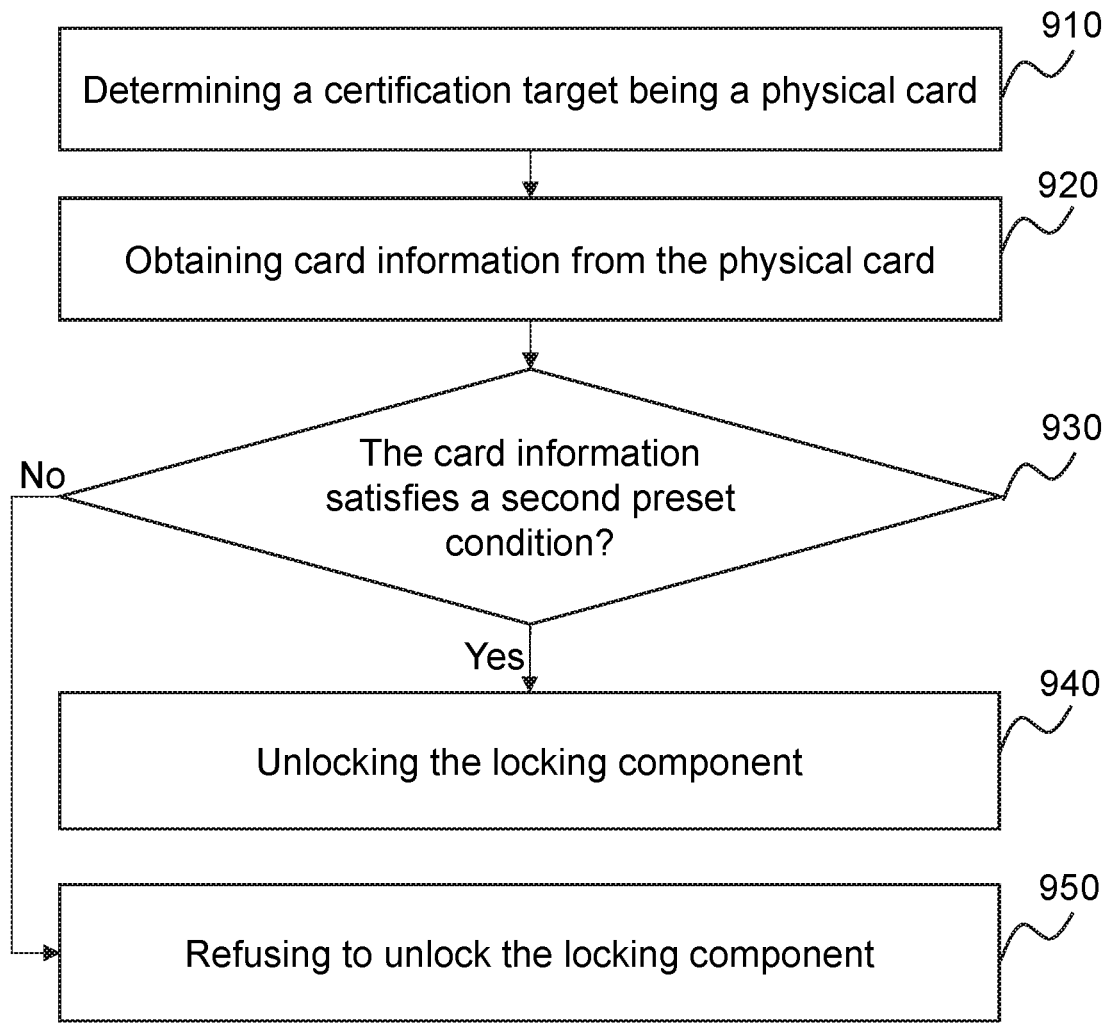
FIG. 9 is a flowchart illustrating an exemplary process for unlocking the intelligent device using a physical card according to some embodiments of the present disclosure.

FIG. 9 is a flowchart illustrating an exemplary process for unlocking the intelligent device using a physical card. In some embodiments, the process 900 shown in FIG. 9 may be implemented in the lock controlling system 100 illustrated in FIG. 1. For example, at least a part of the process 900 may be stored in a storage medium (e.g., the nonvolatile storage 250 of the electronic device 200) as a form of instructions, and invoked and/or executed by the server 110 (e.g., the processor 210 of the electronic device 200, or one or more modules illustrated in FIG. 4). In some embodiments, a part of the process 900 may be implemented on a terminal device. The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, a certification target may be determined to be a physical card.

In some embodiments, the control component may determine that the certification target is a physical card. In some embodiments, the certification target may include an identification tag. The control component may obtain identification information of the identification tag. The identification information may include information regarding the type of the certification target. The control component may determine that the certification target is a physical card based on the identification information.

In 920, account information may be obtained from the physical card.

In some embodiments, the control component may obtain the card information from the physical card. In some embodiments, the physical card may have a card number. In some embodiments, each card may have a unique card number. The card number may correspond to a user account. The card number may be correlated to the account information. In some embodiments, the account information may include information of credit record, balance, real name authentication, or the like, or any combination thereof.

In 930, a determination as to whether the account information satisfies a second preset condition may be made.

In some embodiments, the control component may determine whether the account information satisfies the second preset condition. In some embodiments, the second preset condition may be that the user of the physical card has good credit. In some embodiments, the second preset condition may be that the user of the physical card has a sufficient balance. In some embodiments, the second preset condition may be that the user of the physical card has passed real-name authentication. In some embodiments, the determination as to whether the account information satisfies a second preset condition may be the same as or similar to the operations in 640 of FIG. 6.

If the account information satisfies the second preset condition, the process may proceed to 940, otherwise, the process may proceed to 950.

In 940, the control component may unlock the locking component. In some embodiments, the unlocking of the locking component may be the same as or similar to the operations in 870 of FIG. 8.

In 950, the control component may refuse to unlock the component of the intelligent device 140. The operations that the control component refuses to unlock the locking component of the intelligent device 140 may be the same as or similar to the operations in 880 in FIG. 8.

Figure 10:
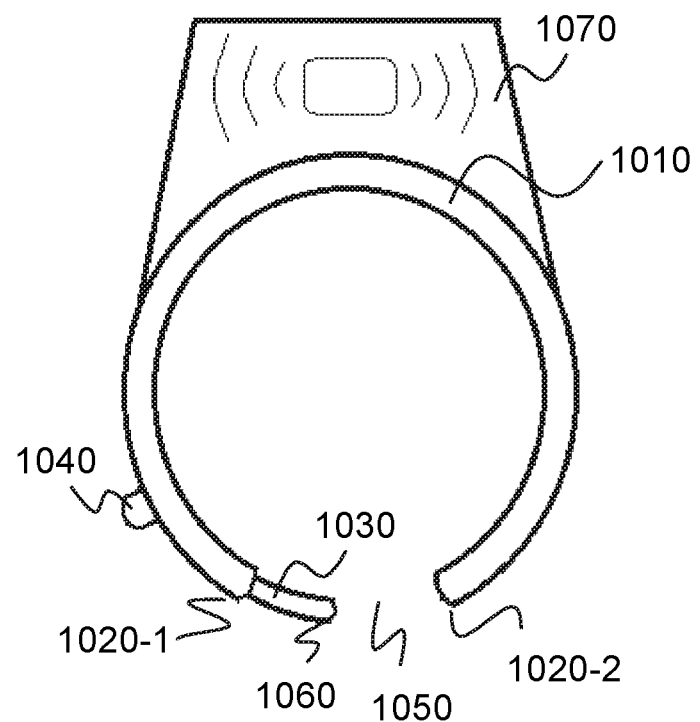
FIG. 10 is a schematic diagram illustrating an exemplary intelligent device according to some embodiments of the present disclosure.

FIG. 10 is a schematic diagram illustrating an exemplary intelligent device according to some embodiments of the present disclosure. The intelligent device may include a target object (not shown in the figure), a control component 1070, and a locking component. The locking component may include a lock ring 1010, a first ring end 1020-1, a second ring end 1020-2, a lock bolt 1030, a bolt adjustor 1040.

In some embodiments, the intelligent device may have an arc structure. For example, the lock ring 1010 may be arc-shaped. The bottom of the controller 1070 may be arc-shaped to match the arc-shaped lock ring 1010.

In some embodiments, the lock ring 1010 may be hollow. In some embodiments, the lock ring 1010 may be made from a rigid material. For example, the lock ring 1010 may be made from metal.

The lock ring 1010 may include the first ring end 1020-1 and the second ring end 1020-2 at two ends. The first ring end 1020-1 and the second ring end 1020-2 may form a mechanism for locking/unlocking the target object. Particularly, there may be a ring gap 1050 between the first ring end 1020-1 and the second ring end 1020-2, providing a space that the target object or a part of the target object may pass when the locking component locks or unlocks the target object. The target object is unlocked when the ring gap 1050 exits, and the target object is locked when the ring gap 1050 is diminished or disappears (e.g., the first ring end 1020-1 and the second ring end 1020-2 is connected by the lock bolt 1030). Merely for illustration purposes, the target object may be a bicycle, the locking component may be set on a wheel (e.g. rear wheel) of the bicycle. When the ring gap 1050 exits, the rear wheel may rotate through the ring gap 1050, and the bicycle is unlocked. However, when the ring gap 1050 is diminished or disappears (e.g., the first ring end 1020-1 and the second ring end 1020-2 is connected by the bolt 1030), the rear wheel may not rotate, and the bicycle in locked.

The lock bolt 1030 may be movably connected to the lock ring 1010. The lock bolt 1030 may include a first bolt end (hidden inside the lock ring 1010) and a second bolt end 1060. The first bolt end may be inside the lock ring 1010 whenever the intelligent device is locked or unlocked. The second bolt end 1060 of the lock bolt 1030 may move from the first ring end 1020-1 to the second ring end 1020-2 when the target object is locked, and may move from the second ring end 1020-2 to the first ring end 1020-1 when the target object is unlocked. The bolt adjustor 1040 may be connected to the lock bolt 1030 for adjusting the movement of the lock bolt 1030. To lock the intelligent device, the bolt adjustor 1040 may move towards the second lock ring end 1020-2, so as to form a closed ring. To unlock the intelligent device, the bolt adjustor 1040 may move away from the second ring end 1020-2. The control component 1070 may control the bolt adjustor 1040 towards the first ring end 1020-1 and/or the second ring end 1020-2.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An intelligent device, comprising:
 a locking component configured to lock a target object; and
 a control component configured to:
  detect appearance of a certification target within a preset range of the control component;
  determine a type of the certification target;
   wherein to determine the type of the certification target, the control component is configured to:
    determine that the certification target is a user terminal; and
  direct the locking component to operate an unlock operation according to the type of the certification target;
  wherein to direct the locking component to operate an unlock operation according to the type of the certification target, the control component is configured to:
   determine whether the user terminal includes a target application;
   in response to a determination that the user terminal includes a target application,
   obtain certification information from the target application of the user terminal, wherein the certification information includes an unlocking code generated or obtained by the target application of the user terminal; and
   unlock the locking component based on the certification information;
   in response to a determination that the user terminal does not include a target application,
   obtain correlation information from the user terminal, wherein the correlation information is associated with at least one of bank account information, electronic wallet information, public transportation account information, or social security information;
   determine whether the correlation information satisfies a first preset condition; and
   in response to the determination that the correlation information satisfies the first preset condition,
   unlock the locking component based on the correlation information.

2. The intelligent device of claim 1, further including the target object, wherein the target object includes a bicycle or a motorcycle.

3. The intelligent device of claim 1, wherein the locking component further includes an arc structure configured to lock the target object, and
 the unlock operation includes retracting the arc structure into a housing on the target object.

4. A method for controlling an intelligent device, wherein the intelligent device including a locking component and a control component, the method comprising:
 determining, by the control component, a certification target within a preset range of the locking component;
 determining, by the control component, a type of the certification target;
  wherein the determining the type of the certification target comprises:
   determining that the certification target is a user terminal; and
 unlocking, by the control component, the locking component through an unlocking mode corresponding to the type of the certification target, comprising:

determining whether the user terminal includes a target application;

in response to a determination that the user terminal includes a target application, obtaining certification information from the target application of the user terminal, wherein the certification information includes an unlocking code generated or obtained by the target application of the user terminal; and unlocking the locking component based on the certification information;

in response to a determination that the user terminal does not include a target application, obtaining correlation information from the user terminal, wherein the correlation information is associated with at least one of bank account information, electronic wallet information, public transportation account information, or social security information;

determining whether the correlation information satisfies a first preset condition; and in response to the determination that the correlation information satisfies the first preset condition, unlocking the locking component based on the correlation information.

5. A system for controlling an intelligent device, the system comprising:

at least one storage medium storing a set of instructions; and at least one processor configured to communicate with the at least one storage medium, wherein when executing the set of instructions, the at least one processor is directed to:

determine a certification target within a preset range of a locking component of the intelligent device;

determine a type of the certification target;

wherein to determine the type of the certification target, the at least one processor is configured to:

determine that the certification target is a user terminal; and unlock the locking component through an unlocking mode corresponding to the type of the certification target;

wherein to direct the locking component to operate an unlock operation according to the type of the certification target, the at least one processor is configured to:

determine whether the user terminal includes a target application;

in response to a determination that the user terminal includes a target application, obtain certification information from the target application of the user terminal, wherein the certification information includes an unlocking code generated or obtained by the target application of the user terminal; and unlock the locking component based on the certification information;

in response to a determination that the user terminal does not include a target application, obtain correlation information from the user terminal, wherein the correlation information is associated with at least one of bank account information, electronic wallet information, public transportation account information, or social security information;

determine whether the correlation information satisfies a first preset condition; and in response to the determination that the correlation information satisfies the first preset condition, unlock the locking component based on the correlation information.

6. The system of claim 5, wherein to determine a type of the certification target, the at least one processor is directed to:

determine that the certification target is a physical card.

7. The system of claim 6, wherein to unlock of the locking component in the unlocking mode corresponding to the type of the certification target, the at least one processor is directed to:

obtain card information from the physical card;

determine whether the card information satisfies a second preset condition; and in response to that the card information satisfies the second preset condition unlock the locking component based on the card information.

8. The system of claim 5, wherein to determine a certification target within a preset range of the locking component, the at least one processor is directed to:

obtain electric signals of the certification target within a preset range of the locking component using a near field communication (NFC) technology.

9. The system of claim 5, wherein to determine a type of the certification target, the at least one processor is directed to:

obtain an identification tag of the certification object; and determine the type of the certification target based on the identification tag.

10. The intelligent device of claim 1, wherein the certification target is a physical card, the physical card includes a bank card, a bus card, a subway card, a social security card, or an ID card, and the control component is further configured to:

read the correlation information of the physical card by electromagnetic detection.

11. The intelligent device of claim 1, wherein the first preset condition includes at least one of a good credit record, a sufficient balance, or a passed real-name authentication.

* * * * *